(12) United States Patent
Large et al.

(10) Patent No.: US 11,897,375 B2
(45) Date of Patent: Feb. 13, 2024

(54) REMOVABLE AND STOWABLE VEHICLE SEAT SYSTEM

(71) Applicant: Honda Motor Co., Ltd., Tokyo (JP)

(72) Inventors: Brian D. Large, Hilliard, OH (US); Francis M. Madrid, Dublin, OH (US); Michael M. Enciso, Marysville, OH (US); Derek S. Lindsay, Marysville, OH (US); Terrie L. Ellison, Hilliard, OH (US); Randy A. Staib, Worthington, OH (US)

(73) Assignee: Honda Motor Co., Ltd., Tokyo (JP)

( * ) Notice: Subject to any disclaimer, the term of this patent is extended or adjusted under 35 U.S.C. 154(b) by 72 days.

(21) Appl. No.: 17/586,030

(22) Filed: Jan. 27, 2022

(65) Prior Publication Data
US 2023/0234483 A1 Jul. 27, 2023

(51) Int. Cl.
B60N 2/30 (2006.01)
B60R 5/04 (2006.01)

(52) U.S. Cl.
CPC .............. *B60N 2/3097* (2013.01); *B60R 5/04* (2013.01)

(58) Field of Classification Search
CPC ................................ B60N 2/3097; B60R 5/04
USPC ........................................................ 296/65.03
See application file for complete search history.

(56) References Cited

U.S. PATENT DOCUMENTS

| | | | | |
|---|---|---|---|---|
| 2,094,401 A | * | 9/1937 | Girl ........................... | B60R 5/04 224/42.32 |
| 4,226,461 A | * | 10/1980 | Ackel ....................... | B60R 5/04 296/37.16 |
| 6,488,327 B1 | * | 12/2002 | Pearse ................... | B60N 2/2863 297/188.1 |
| 6,609,745 B2 | | 8/2003 | Miyahara et al. | |
| 6,955,386 B2 | | 10/2005 | Rhodes et al. | |
| 7,040,685 B2 | | 5/2006 | Sumida et al. | |
| 7,097,401 B2 | * | 8/2006 | Haspel ................... | B60P 7/0815 410/101 |
| 7,156,439 B2 | * | 1/2007 | Bejin ........................ | B60R 5/04 296/208 |
| 7,393,038 B2 | * | 7/2008 | Yajima ............... | B60N 2/01583 296/64 |

(Continued)

FOREIGN PATENT DOCUMENTS

| | | |
|---|---|---|
| DE | 102006031886 A1 | 3/2007 |
| DE | 10337623 B4 | 5/2020 |

(Continued)

*Primary Examiner* — Pinel E Romain
(74) *Attorney, Agent, or Firm* — Plumsea Law Group, LLC

(57) ABSTRACT

A removable and stowable vehicle seat system includes a seat that can be folded into a compact form factor and a retainer provided in a cargo area of the vehicle to receive and retain the folded seat. The retainer is sized and shaped to receive the folded seat in a close arrangement to ensure the folded seat stays in place. A strap is also provided with tether hooks to secure the folded seat within the retainer by engaging the tether hooks to body anchors provided in the retainer. The floor recess of the retainer has features to easily receive a folded seat and position it into an optimal resting position. The floor recess may be provided with pads to engage with feet on the base of the folded seat. The pads serve to securely locate the seat within the retainer and to dampen vibration of the stored seat while the vehicle is in motion.

17 Claims, 7 Drawing Sheets

(56) References Cited

U.S. PATENT DOCUMENTS

| | | | |
|---|---|---|---|
| 8,011,714 B2 | 9/2011 | Parkinson et al. | |
| 8,894,031 B2 | 11/2014 | Sailer et al. | |
| 9,789,793 B2 | 10/2017 | Abe et al. | |
| 10,202,069 B2* | 2/2019 | Salter | B60Q 3/225 |
| 2003/0184107 A1* | 10/2003 | Hapspel | B60R 5/04 |
| | | | 296/24.4 |
| 2009/0218849 A1* | 9/2009 | Rupar | B60R 5/04 |
| | | | 296/182.1 |
| 2020/0324671 A1 | 10/2020 | Riad | |
| 2022/0289113 A1* | 9/2022 | Salter | B60R 7/04 |

FOREIGN PATENT DOCUMENTS

| | | | |
|---|---|---|---|
| EP | 1332919 B1 * | 10/2007 | B60R 5/047 |
| EP | 2957457 B1 | 4/2020 | |
| JP | 2004306799 A | 11/2004 | |
| JP | 4066756 B2 | 3/2008 | |
| JP | 2008143435 A | 6/2008 | |
| JP | 2010006355 A * | 1/2010 | B60R 5/04 |
| JP | 4793142 B2 | 10/2011 | |

\* cited by examiner

REMOVABLE AND STOWABLE VEHICLE SEAT SYSTEM

BACKGROUND

1. Field of the Disclosure

The present invention relates generally to seats and more particularly to vehicle seats that are removable and stowable within the vehicle.

2. Description of Related Art

Many passenger vehicles, such as, but not limited, minivans, sport utility vehicles (SUVs), sports activity vehicles (SAVs) and crossover SUVs (CUVs), include multiple rows of seating. The rear passenger seating in these vehicles is often configured to adjust to a variety of uses of the seats. Many vehicles include seating that can be moved and shifted into various configurations. Some vehicles allow seating to be folded in various combinations and configurations. In some of these vehicles, the seats fold into the floor area of the vehicle, and might have their seatbacks that can serve as armrests or tables/consoles with amenities such as cupholders. Other vehicles have seats that are designed to be removed from the vehicle completely or slid along a track. An example of a vehicle with multiple seat configurations is described in U.S. Pat. No. 8,118,359, which is incorporated by reference in its entirety.

In general, this description will refer to the seats in a vehicle as front seats for the first row of seats in the cabin behind the windshield, normally for a driver and front seat passenger. The rear seats immediately behind the front seats will be referred to as the second row seats. The next set of rear seats immediately behind the second row seats will be referred to as the third row seats. Vehicles with these three rows of seats sometimes include various ways of arranging the seats for flexibility in use. When referring to the front or rear, this description is referring to the front or rear of the vehicle itself, and when referred to the right or left, this description is using the reference point of the inside of the vehicle facing forward. That is in the United States, most passenger vehicles have the driver seat in the front and left corner of the cabin.

In vehicles with at least three rows of seats, the third row of seats is usually a bench seat to accommodate up to three passengers. The second row of seats might have a bench seat configuration as well with either or both the left and right side seats being able to fold or tilt to enable passenger access to the third row. It would be advantageous to be able to configure the second row as two separate seats or as a bench seat depending on the number of passengers. Generally, a three row vehicle can comfortably accommodate eight people, two in front, three in the second row and three in the third row. Many users find that configuring the second row to seat two people is more comfortable as there is ample space for the passengers and their belongings. However, it would be advantageous to be able to quickly configure the second row to accommodate the maximum number of people.

SUMMARY OF THE INVENTION

The desired flexibility in seat configurations is provided by a rear seat row, the second row in the illustrated example, that has a middle seat that is removable and stowable within the vehicle away from the second row. This configuration provides ample space to the passengers in the second row by leaving an empty space between the left and right seats. When not used the middle seat can be removed entirely, folded, and stowed in a dedicated storage space in the vehicle. The storage space is specially configured behind the third row to nestingly receive the folded seat and secure it there. The folded seat is held in a retainer that is sufficiently deep to enable a lid to cover the stored seat and provide a flat surface.

In one aspect, the disclosure provides a vehicle seat system comprising a seat with a base that can connect to the vehicle floor, and a seat cushion and a seat back foldable relative to one another and ranging from an unfolded seating position to a folded storage position in which the seat cushion and the seat back are in contact and overlapping one another. The system includes a specially designed retainer in a cargo area of the vehicle, the retainer has a floor and an upper opening to receive and contain folded seat. The retainer has a floor recess that may nestingly receive the base of the seat, a pair of ledges stepped upward from the floor recess to surround the seat, a body anchor provided on each ledge, and an upper flange stepped upward from the ledges to define upper opening. The system may include a lid connected to the upper flange and movable from an open position in which the opening to the retainer is available for loading, to a closed position in which the lid is flush with the upper flange to provide a flat storage surface. The system may also include a strap having a tether hook on each end to connect to the body anchors to secure the folded seat in the retainer when stowed. In this way, the seat can be easily taken from the storage area and installed to provide extra passenger seating whenever necessary.

In another aspect, the disclosure provides a removable and stowable vehicle seat system comprising a base and a seat cushion and a seat back foldable relative to one another from an unfolded seating position to a folded storage position, and a retainer configured to nestingly receive the folded seat in a cargo area. The retainer has a floor recess to receive the base, and is configured with a pair of ledges stepped upward from the floor recess to surround said seat, and an upper flange stepped upward from the ledges and defining the opening of the retainer.

The seat system is possible because of the design of the vehicle cargo bin which includes a retainer configured to nestingly receive a folded vehicle seat in its floor recess. The retainer includes a ledge stepped upward from the floor recess to surround a folded vehicle seat, and an upper flange stepped upward from the ledge to define an opening to the retainer. A lid may be provided to connect to the upper flange to selectively cover the opening and provide a flat storage surface when closed. A body anchor is provided in the retainer for receiving a tether hook to secure a folded vehicle seat or other cargo within in the retainer.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

Figure 1:
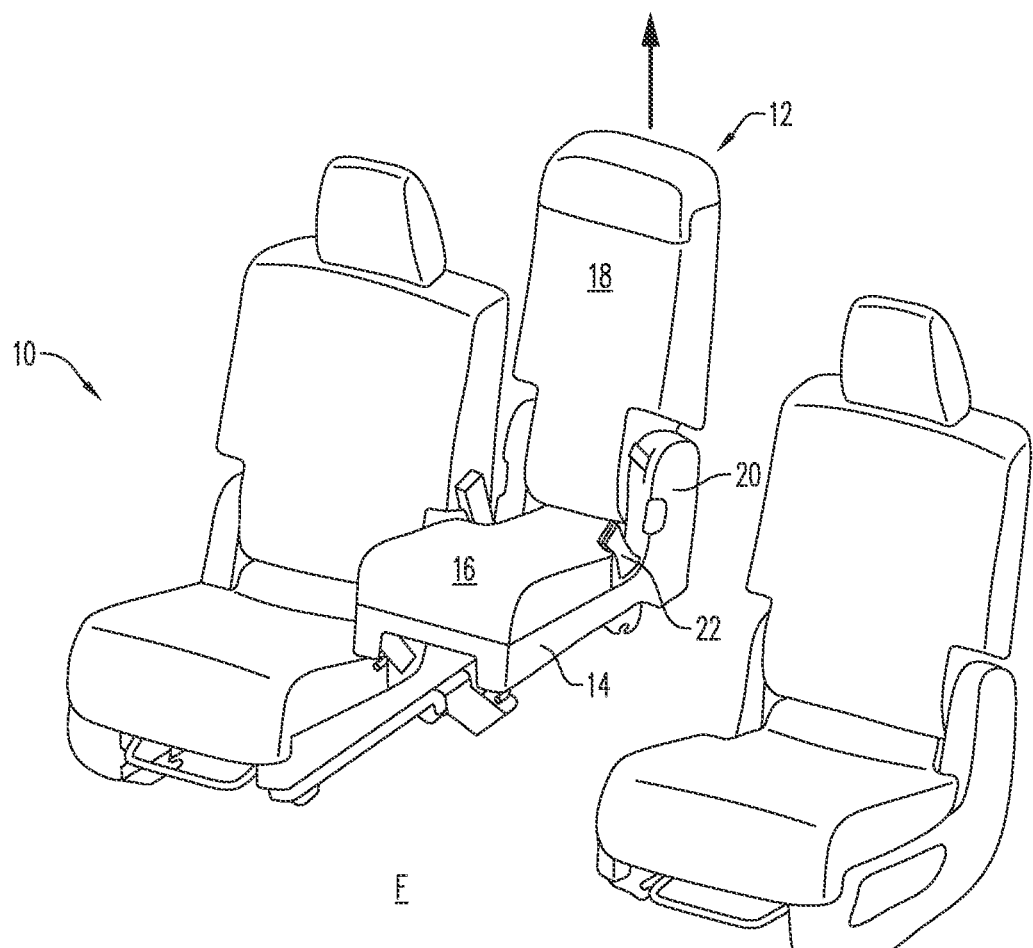
FIG. 1 is a schematic view of a rear row seat showing a middle seat that is removable.

A removeable and stowable center seat of a rear seat row of a vehicle is illustrated as being from the second row, however the removeable and stowable middle seat may be from any rear row of seats. It is advantageous to carry the removed and folded seat within the vehicle so that it can be installed at any time when needed for extra seating capacity or to provide a continuous seating surface for other reasons. It is also advantageous to provide a dedicated space to stow the seat in the vehicle and have it covered and protected. FIG. 1 illustrates a rear seat row 10 with the middle seat 12 being removed in a schematic sense. It will be understood that the seats are all secured to the floor F of the vehicle in any number of known ways by connected their bases to hardware in the floor. In the case of middle seat 12, it has a base 14 onto which a seat cushion 16 is connected. The seat also has a seat back 18 that is attached to the seat cushion and base by a hinge 20. The details of hinge 20 might vary and could be any structure that enables seat back 18 to fold onto and overlap seat cushion 16 so that they touch each other and present a compact folded seat. Seat 12 will also have various seat belt components which are labeled for illustration purposes as belt component 22. Again, the details of the seat belt mechanism may vary and comprise multiple elements.

The removal of seat 12 from the floor F of the vehicle is made possible by any number of conventional mechanisms. It is also possible that seat 12 is secured to the other seats in the row as well or instead of to the floor. The removability of seat 12 provides extra space between the seats in the row and may also enable access to a row of seats behind the row illustrated in FIG. 1. When a seat like seat 12 is removed, it is advantageous to be able to store the seat onboard the vehicle to enable a quick re-configuration if seat 12 is needed again for seating or other reasons. In this disclosure, it is advantageous to store seat 12 away from its installed position to ensure that the floor space between the seats is clear, and possibly for other reasons such as mechanical reasons that might make it advantageous to keep the floor flat at that location.

Figure 2:
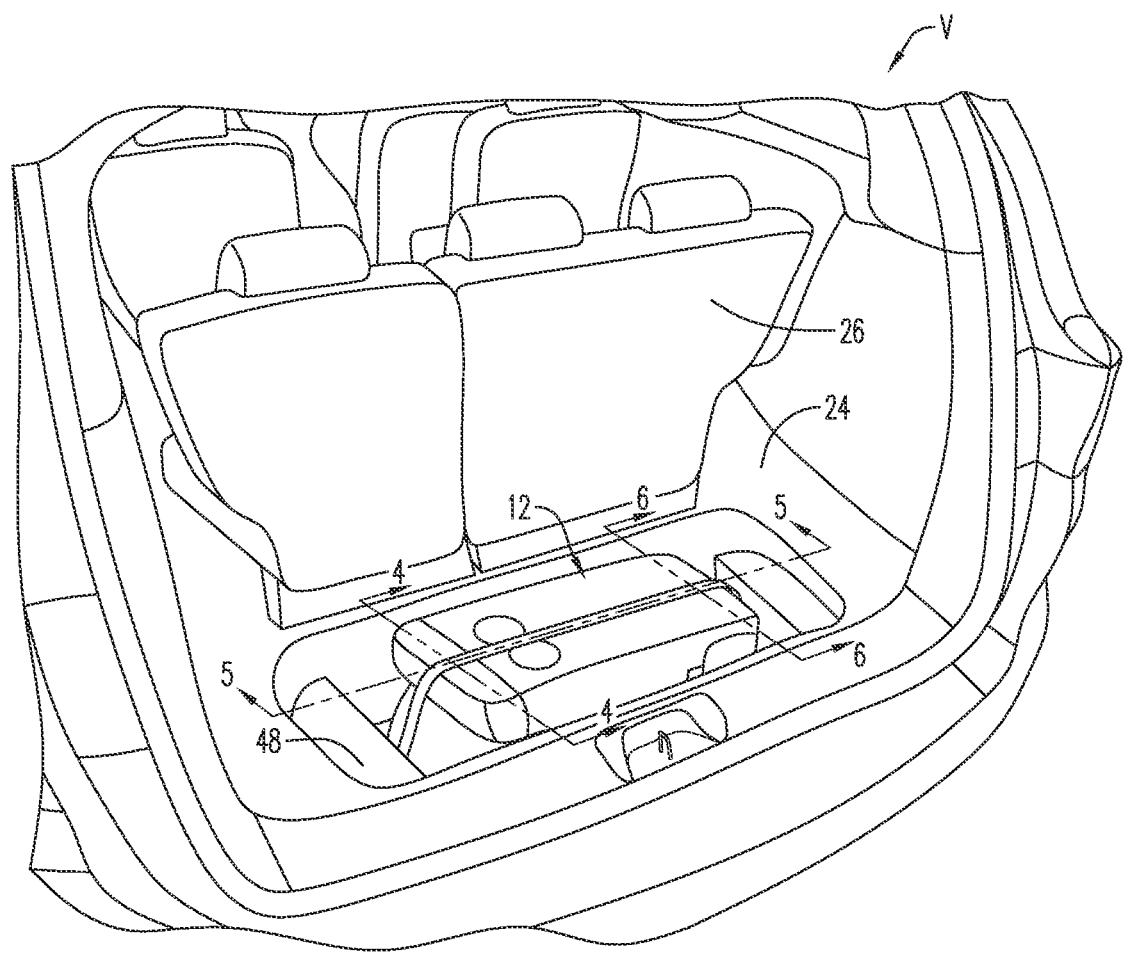
FIG. 2 is a schematic view of a rear cargo area of a vehicle showing the middle seat folded, stowed, and retained in a seat retainer.
Figure 3A:
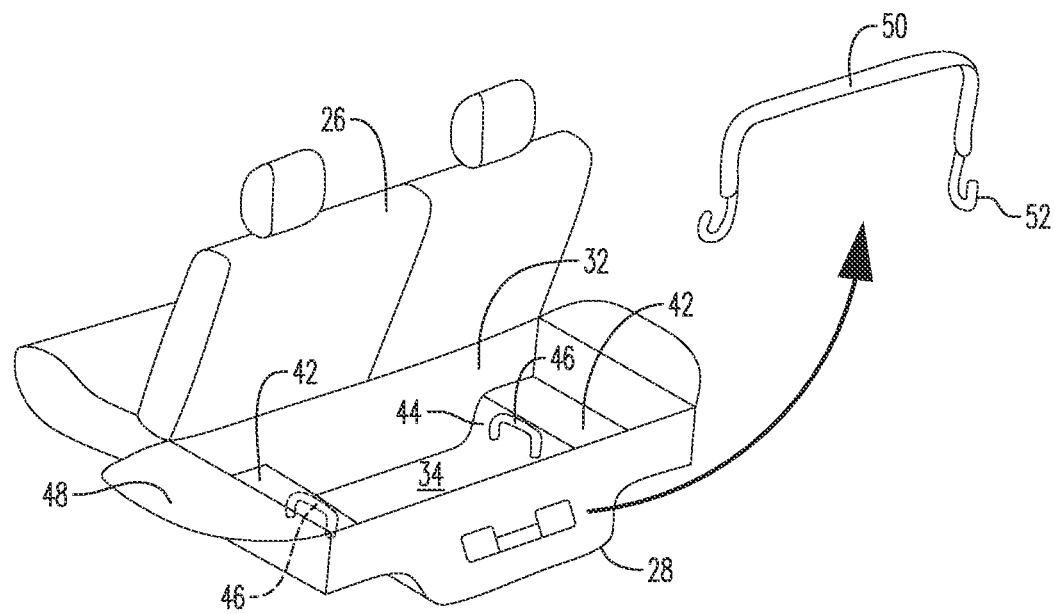
FIG. 3A is a schematic view of a seat retainer in the rear cargo area of a vehicle shown empty and with a strap.
Figure 3B:
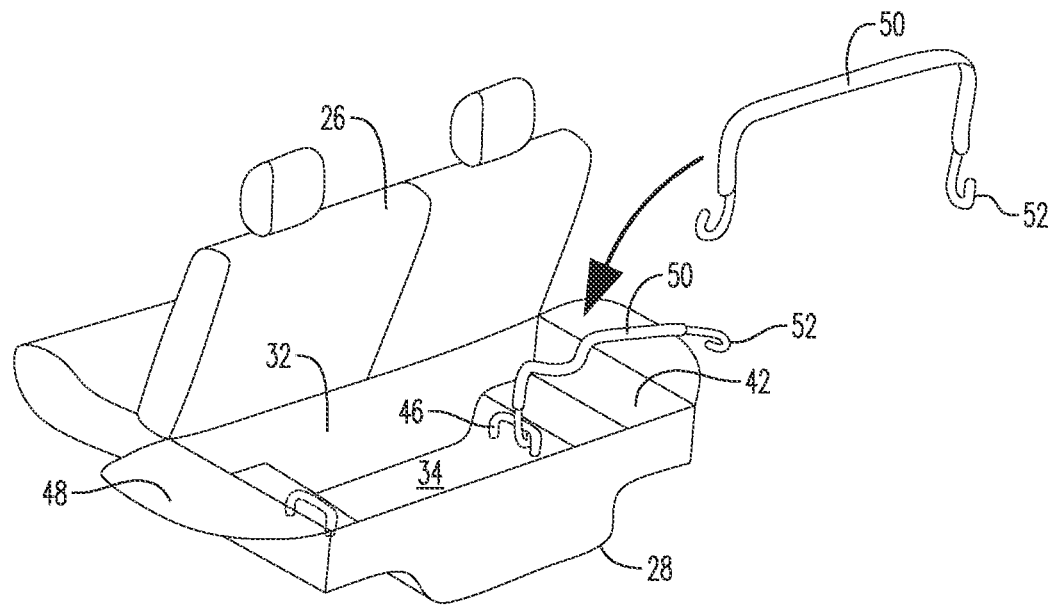
FIG. 3B is a schematic view of the seat retainer of FIG. 3A shown with the strap hooked to one body anchor.
Figure 3C:
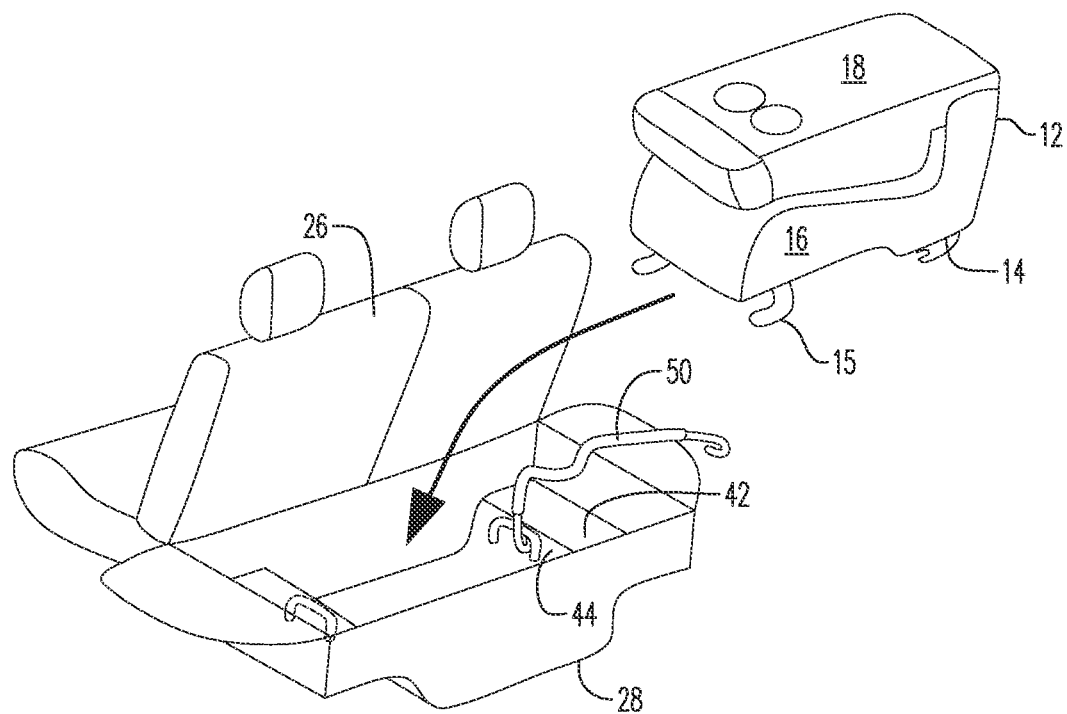
FIG. 3C is a schematic assembly view of the seat retainer of FIG. 3A shown with a folded seat being loaded into the opening.
Figure 4:
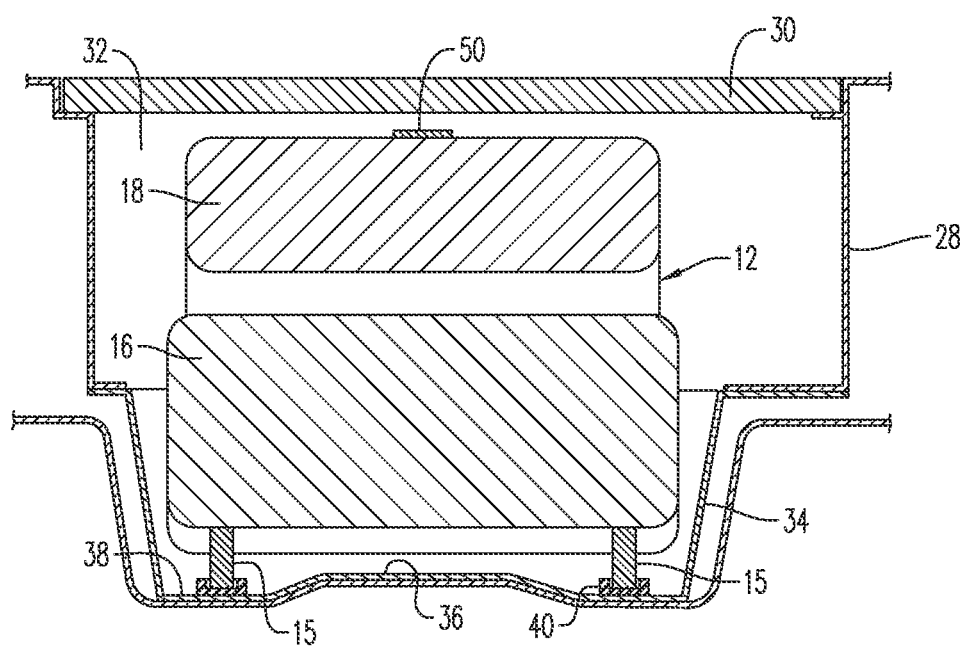
FIG. 4 is a sectional view taken along line 4-4 in FIG. 2.
Figure 5:
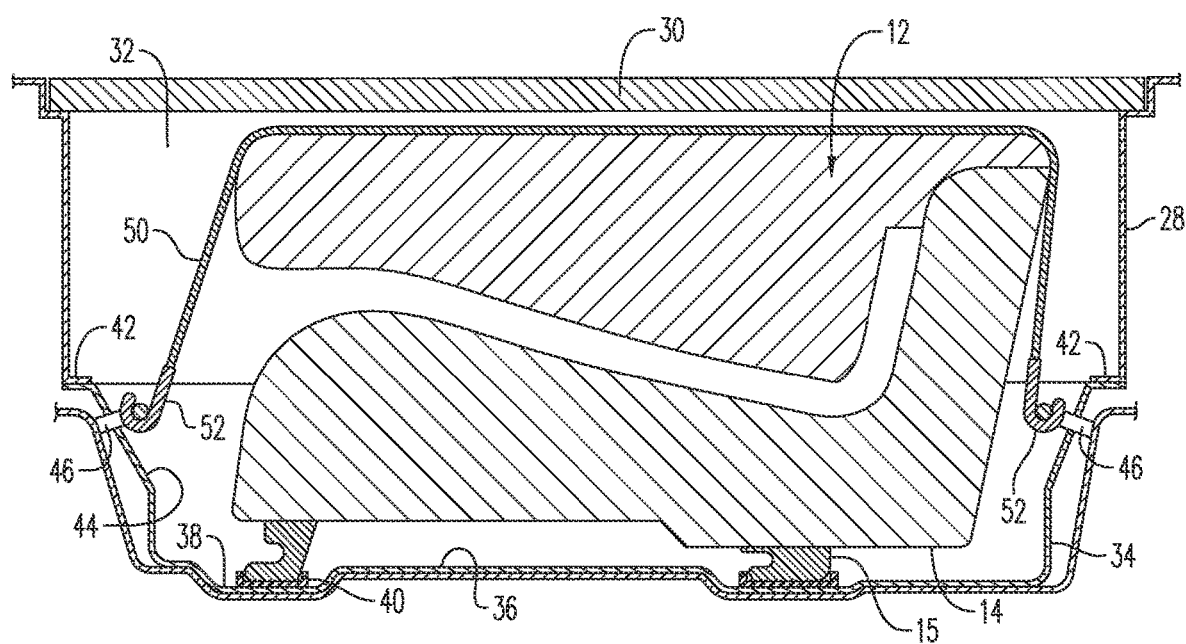
FIG. 5 is a sectional view taken along line 5-5 in FIG. 2.
Figure 6:
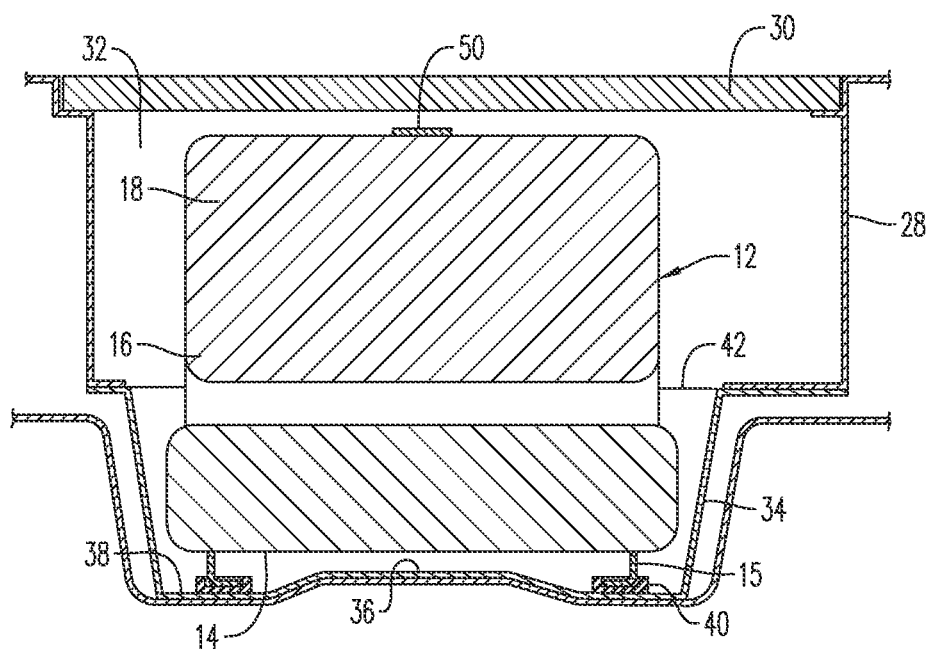
FIG. 6 is a sectional view taken along line 6-6 in FIG. 2.

To enable storage of seat 12 within the vehicle, a cargo area 24 is illustrated for in FIG. 2 as being in the rear portion of the vehicle, behind a row of seats 26. In this exemplary illustration, cargo area 24 is shown to be in the tailgate area of a vehicle V. As seen in FIG. 2, a specially configured retainer 28 is positioned in the floor of the cargo area. Retainer 28 defines a space that will receive the folded seat and retain it during travel. FIGS. 3A-3D show a series of schematic images that show how the folded seat is placed in retainer 28. FIGS. 4-6 show the cross sectional details of the arrangement illustrated in FIG. 2, with the addition of lid 30.

First, as to the use of retainer 28, reference is made to FIGS. 3A-3D in which retainer 28 is shown in isolation behind a row of seats 26. Retainer 28 has a top opening 32 into which folded seat 12 can be placed for storage. The shape of retainer 28 includes a floor recess 34 which has a smaller horizontal cross section compared to top opening 32. Floor recess 34 is sized to receive base 14 of seat 12. Base 14 may be comprised of a plurality of feet 15 which may have structural elements for attachment to the vehicle floor or other hardware when the seat is installed for seating. Floor recess 34 may have a contoured surface as best seen in FIGS. 4-6 in which a central area 36 is raised relative to corners 38 where the feet would be placed. The corners may be provided with rubber pads 40 which are positioned to engage with respective feet 15. The combination of the raised central area 36, the lower corners 38 and rubber pads 40 will facilitate insertion of the folded seat into the retainer and its positioning in it. The rubber pads may serve to help correctly and easily position the folded seat in recess 34 as well as provide shock absorption, vibration dampening and noise control when the folded seat is stowed, specially during movement of the vehicle.

Figure 3D:
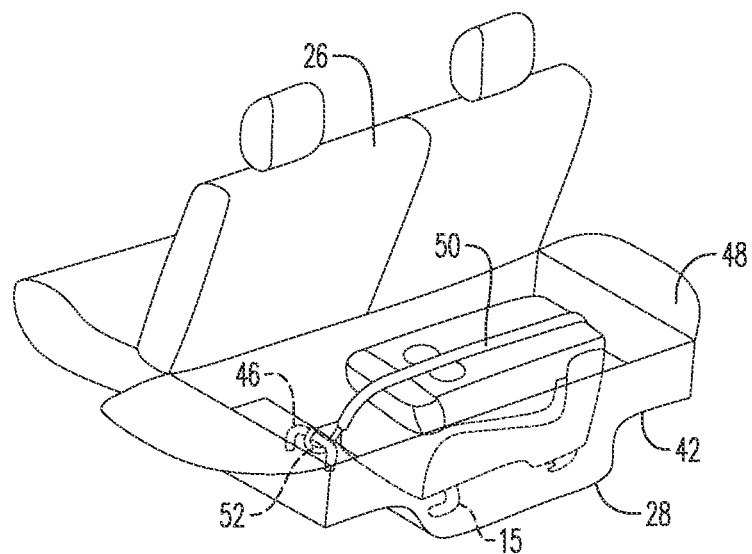
FIG. 3D is a schematic view of the folded seat strapped into the seat retainer, similar to FIG. 2.

Stepped upward from floor recess 34 are a pair of opposing ledges 42 which surround seat 12 when in place (FIGS. 2 and 3D). Ledges 42 are defined by substantially vertical surfaces 44 that extend to the floor recess. In the illustrated embodiments, body anchors 46 are provided from the cargo lining through surfaces 44 to provide attachment points for a strap, described below. Stepped upward from ledges 42 is an upper flange 48 that may provide a seat for lid 30 (FIGS. 4-6). It is noted that FIGS. 3A-3D are schematic in nature, and may not illustrate proportions or scale exactly, but illustrate the sequence of stowing the folded seat. FIGS. 2 and 4-6 provide more proportional illustrations of the vehicle seat system, but it is noted that the claims are not limited to any scale or proportions. As best seen in FIGS. 4-6, retainer 28 is sized so that it completely receives the folded seat, and the height of the folded seat is substantially similar to the depth of the retainer such that when the lid is in place covering the opening, it presents a flat top surface to provide a stable surface for storage of other objects, and protects the folded seat from potential damage and contamination. Seat back 18 folds about hinge 20 such that the seat back overlays the seat cushion to such an extent that the seat back is generally flat and flush with the opening to enable the lid to completely cover the opening so that the folded seat is not visible.

After the folded seat is placed in the retainer, it is secured in place by a strap 50 which has tether hooks 52 on each end. Tether hooks 52 may be similar to the child safety tether style hook and engage onto body anchors 46 so that the strap overlays the folded seat and is secured to the anchors. In this manner, the folded seat is secured within the retainer to ensure that it stays in place while the vehicle is in motion or even in the event of a collision. The strap may be fixed length to ensure that it holds the folded seat tightly in place. The strap may also have some extensibility to facilitate tie down while the hooks are engaged to the anchors. While open hooks are illustrated, it is within the scope of the disclosure to employ other types of hooks and fasteners such as hooks with a swinging closure, carabiner style hooks or the like. The strap may be stored on the retainer as indicated by an arrow in FIG. 3A. The storage might be in a different area of the retainer or liner while the strap is not in use. FIG. 3B shows the strap in a partially fastened position as well as in isolation with an arrow indicating how the strap might be attached to one of the body anchors. As can be seen in schematic diagrams FIGS. 3A-3D, one end of strap 50 may be attached to a body anchor prior to the insertion of the folded seat. FIG. 3C shows schematically how a folded seat 12 may be inserted into retainer. As previously described, feet 15 of the seat will be easily located onto landing pads 40 in the floor recess of the retainer to nest the seat into the retainer. Once the folded seat is in place, the strap is placed over the seat and the other hook of strap 50 is engaged to body anchor 46 to secure the seat within retainer, FIG. 3D. As seen in FIGS. 2 and 3D, the retainer is sized and shaped to receive seat 12 so that lid 30 can overlay the opening, and the seat is completely covered and hidden from view.

If seat 12 is installed for passenger use, the retainer would be empty and available for storage for other items. The use of lid 30 may be optional when the retainer is used for cargo other than a folded seat. In this manner, the retainer provides flexible storage space when the seat is not stowed. It is advantageous to provide a dedicated space for the seat to secure it in place when stowed, out of view and out of the way to maximize the space for the passengers in that row of seats.

As for the lid, it may rest in a tongue-in-groove slot along one edge of the opening and be locked with a latch along the opposite side. The lid may not be attached to the vehicle and may be removed from the vehicle or placed in position. The lid may be in place to close off the retainer opening when the folded seat is stored.

While the removeable seat in the illustrated embodiment is a middle seat of a row, it is understood that any seat of a row of seats may be the removable one that can be stored in an appropriately sized and shaped retainer. Also, while the illustrated embodiment shows a third row of seats behind which is the cargo area of the vehicle, it is understood that the removable seat could be in a row of seats which is immediately in front of a cargo area, or multiple rows of seats might be in place between the row from which the stored seat is removed and the last row in front of the cargo area of the vehicle.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

We claim:

1. A vehicle seat system comprising:
 a seat comprising a base adapted to connect said seat to the vehicle, said seat also having a seat cushion and a seat back foldable relative to the seat cushion ranging from an unfolded seating position to a folded storage position in which the seat cushion and the seat back are in contact and overlapping one another;
 a retainer having a floor and an upper opening, said retainer to receive and contain said seat in a folded position, said retainer having a floor recess to nestingly receive the base of the seat, a pair of ledges stepped upward from said floor recess to surround the seat, a body anchor projecting from each ledge, and an upper flange stepped upward from said ledges and defining the opening;
 a lid connected to the upper flange and movable from an open position in which the opening to the retainer is available for loading, to a closed position in which the lid is flush with the upper flange to provide a flat storage surface; and
 a strap having a tether hook on each end to connect to the body anchors, when hooked the strap overlaying the folded seat to secure the seat within the retainer.

2. The vehicle seat system of claim 1, wherein the depth of the retainer is substantially equal to the height of the seat in the folded configuration.

3. The vehicle seat system of claim 1, wherein the vertical wall is integral with the ledge.

4. The vehicle seat system of claim 1, wherein the strap is fixed length.

5. The vehicle seat system of claim 1, further comprising a rubber pad disposed in the floor recess to engage the base when the folded seat is nested therein.

6. The vehicle seat system of claim 1, wherein said floor recess has a contoured surface for engaging the geometry of the folded seat.

7. A removable and stowable vehicle seat system comprising:
 a seat comprising a base with a seat cushion and a seat back foldable relative to one another from an unfolded seating position to a folded storage position; and
 a retainer configured to nestingly receive said seat in a folded position, said retainer having a floor recess to receive the base, a pair of ledges to surround said seat, a body anchor provided on the ledge, and an upper flange defining the opening of the retainers;
 wherein the depth of the retainer is sufficient to contain the folded seat with the upper surface of the folded seat being substantially flush with the upper flange.

8. The vehicle seat system of claim 7, wherein the depth of the retainer is sufficient to contain the folded seat with the upper surface of the folded seat being substantially flush with the upper flange.

9. The vehicle seat system of claim 8, further comprising a lid to close the opening and be coextensive with the upper flange.

10. The vehicle seat system of claim 7, further comprising a strap with a tether hook to connect with said body anchor and overlay the folded seat to secure it in the retainer.

11. The vehicle seat system of claim 7, wherein the base comprises a foot portion to engage with a seat track.

12. The vehicle seat system of claim 11, further comprising a rubber pad disposed in said floor recess to engage said foot portion.

13. The vehicle seat system of claim 7, wherein said floor recess is contoured to matingly engage the base.

14. A vehicle cargo bin comprising:
 a retainer affixed in said cargo bin, said retainer configured to nestingly receive a folded vehicle seat in a floor recess, said retainer including a ledge stepped upward from said floor recess to surround a folded vehicle seat, and an upper flange stepped upward from said ledge to define an opening;
 a lid connected to said upper flange to selectively cover said opening and provide a flat storage surface when closed; and
 a body anchor projecting from a substantially vertical face of the ledge in said retainer for matingly receiving a tether hook to secure a folded vehicle seat or other cargo in said retainer.

15. The vehicle cargo bin of claim 14, wherein said floor recess is contoured with a central area that is higher than the corners.

16. The vehicle cargo bin of claim 14, wherein said cargo bin is located in the rear interior of a vehicle.

17. The vehicle cargo bin of claim 14, further comprising a storage element for storing a strap.

\* \* \* \* \*